J. W. WILLSON.
MOTOR.
APPLICATION FILED MAR. 3, 1910.

982,917.

Patented Jan. 31, 1911.

2 SHEETS—SHEET 1.

Witnesses

Inventor
John W. Willson.
By C. A. Snow & Co.
Attorneys

J. W. WILLSON.
MOTOR.
APPLICATION FILED MAR. 3, 1910.
982,917.
Patented Jan. 31, 1911.
2 SHEETS—SHEET 2.
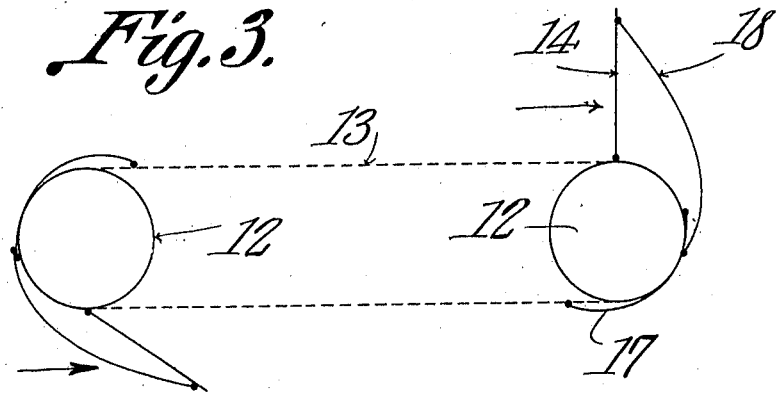
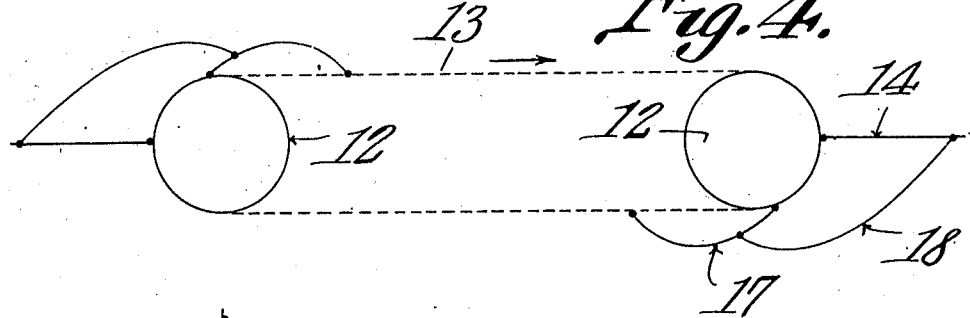
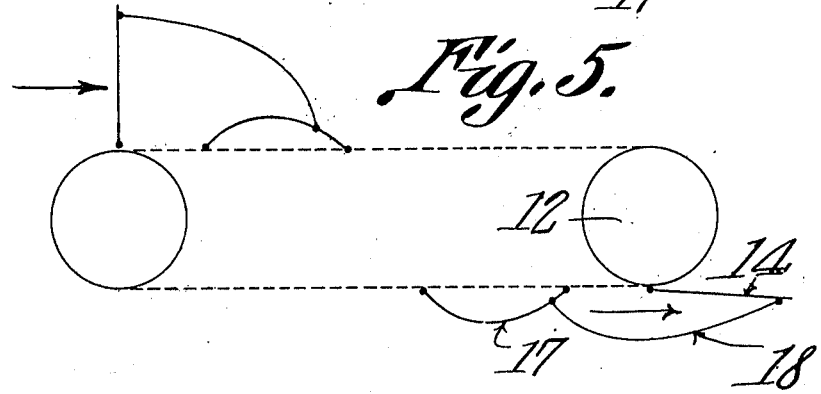
Inventor
John W. Willson.

UNITED STATES PATENT OFFICE.

JOHN W. WILLSON, OF NORRIS, ILLINOIS.

MOTOR.

982,917. Specification of Letters Patent. Patented Jan. 31, 1911.

Application filed March 3, 1910. Serial No. 547,093.

*To all whom it may concern:*

Be it known that I, JOHN W. WILLSON, a citizen of the United States, residing at Norris, in the county of Fulton and State of Illinois, have invented a new and useful Motor, of which the following is a specification.

This invention has for its object to provide an improved motor operated by the current of a river or stream, to generate power for any purpose.

The motor consists of a set of sprocket wheels over which run sprocket chains carrying blades or paddles on which the force of the current is spent. The motor is submerged in the stream, and the blades are so mounted as to come into operative position on the upper run of the chains, and to feather on the lower run.

The invention is illustrated in the accompanying drawings forming a part of this specification, in which drawings—

Figure 1:
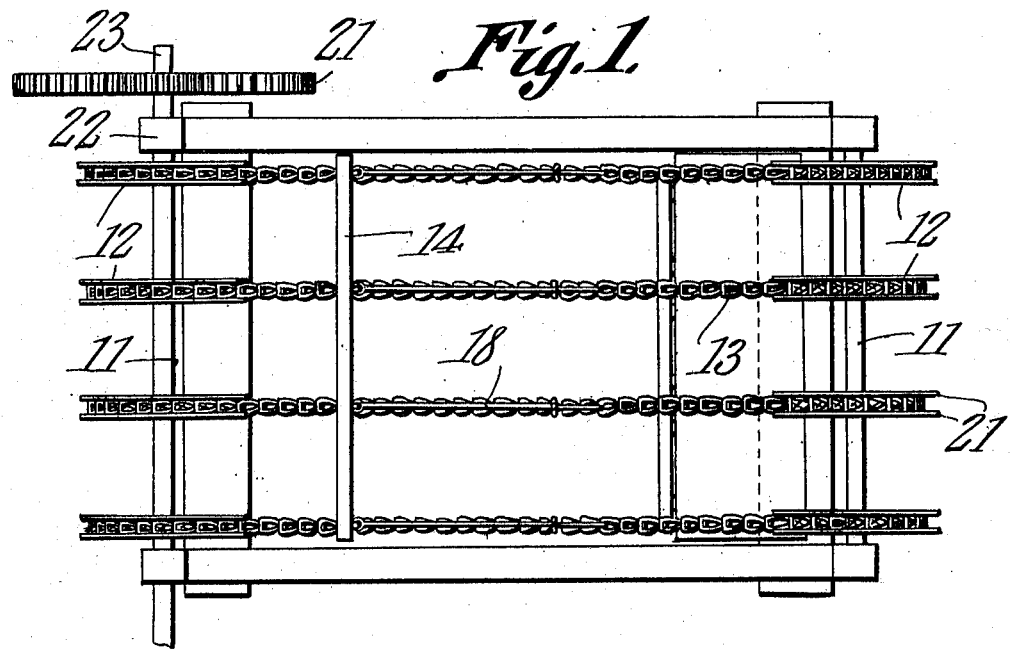
Figure 2:
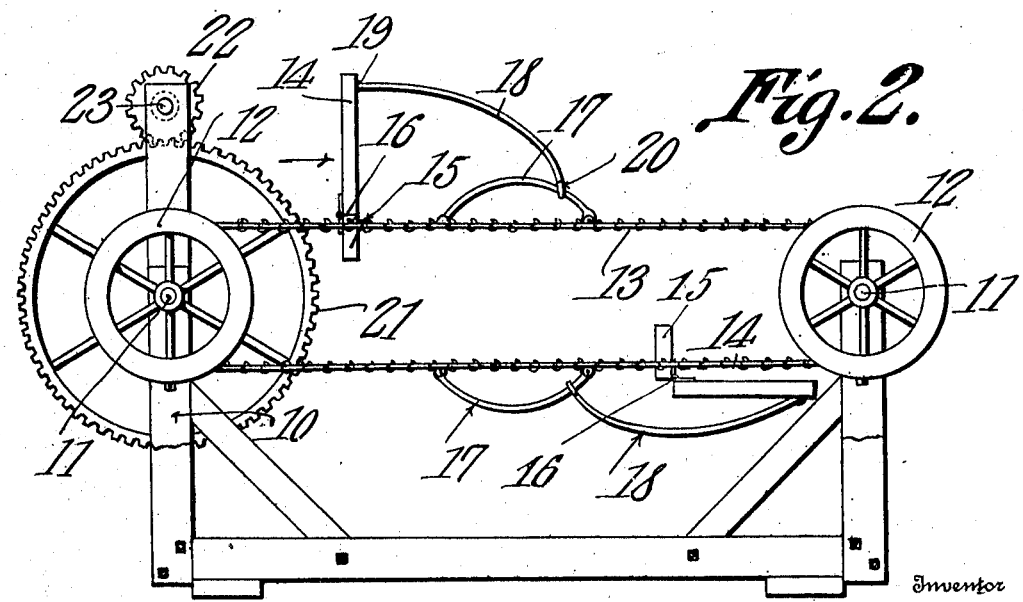

Figure 1 is a plan view of the motor. Fig. 2 is a side elevation. Figs. 3 to 5 are diagrams illustrating the operation of the paddles.

Referring to the drawings, there is shown at 10 a suitable frame work which supports the parts constituting the motor. This frame work will be so mounted in the stream, as to entirely submerge the motor therein. At the end of the frame work are bearings in which are journaled horizontal shafts 11 fitted with sprocket wheels 12, the sprocket wheels of one shaft being connected to the sprocket wheels of the other shaft by chains 13. These chains carry blades against which the force of the current is spent, whereby the chains are put in motion, and a rotary movement is imparted to the shafts 11. A suitable gearing will be provided for connecting either one or both of the shafts to the machinery to be driven. The drawings show two blades, but it will be evident that the chains may be equipped with any number thereof. The blades are sufficiently long to extend across the entire surface of chains, and they are hinged, so that they may feather on the lower run, as shown in Fig. 2. The hinge connection may be made by forming the blades in two sections, 14 and 15, and connecting the sections by a hinge 16, the section 15 being fastened to the chains in any suitable manner, and extending for a short distance above and below the chains. The sections 15 are also cut away to clear the sprocket wheels 12. Any other suitable hinge connection may be provided.

In front of the blades, the chains 13 carry curved bars 17 to which are slidably connected braces 18 pivotally connected to the back of the blades, near their outer ends, as indicated at 19. The braces are formed with eyes 20 through which the bars 17 loosely pass. The bars 17 are formed of spring metal, so that they may yield when going around the sprocket wheels. The rims of the sprocket wheels are formed with outstanding flanges 21 which serve as guards to prevent the chains from slipping off the same, the chains passing over the sprocket wheels between said flanges.

Figs. 3 to 5 illustrate diagrammatically the operation of the blades. The arrows indicate the direction in which the current is traveling. The force of the current is spent on the blades when they are on the upper run of the chains, and when said blades reach the lower run of the chains, as they are then traveling against the current, they swing rearwardly so as to lie flat against the chains as shown in Figs. 2 and 5. The blades therefore offer a minimum amount of resistance to the current against which they travel. When the lower blade reaches the sprocket wheels on the left hand end of the apparatus, said blade commences to swing outwardly from the lower run of the chains as shown in Fig. 3. This outward swing is continued as the blade is passing around this sprocket wheel, and when the blade reaches the upper run of the chains, it assumes an erect position as shown in Fig. 5, so that it now receives the full impact of the current. The sliding connection between the bars 17 and the braces 18, permit the blades to swing as stated. When the blades are in erect position on the upper run of the chain, they are prevented from tilting forwardly in the direction the current is traveling, by reason of the fact that the braces 18 have slid forwardly to the remote ends of the bars 17. Entering into feathering position, the braces 18 slide in the opposite direction on the bars 17, so as to permit the blades to swing rearwardly in the direction of the chains. When the blade passes over the sprocket wheels at the right hand of the apparatus, it is tilted forwardly into horizontal position as shown in Fig. 4, in which position it remains as it passes under said sprocket wheels, and along the lower run of the chains, the blade then lying flat against the said lower run of the chains as shown in Figs. 2 and 5.

The motor herein described is simple in construction, and highly efficient in operation, and it may be utilized to generate power for any purpose. The preferred embodiment of the invention has been shown, but it will be understood that many minor changes in the structural details may be resorted to without a departure from the spirit of the invention.

The arrangement of the feathering blades may also be utilized in conveyer structures, and various other relations.

On one of the shafts 11 is mounted a spur gear 21 meshing with a pinion 22 mounted on a shaft 23 for transmitting the power of the motor.

What is claimed is:

A current motor comprising a supporting frame, endless chains carried by said frame, blades pivotally connected to the chains, braces connected to the blades, and curved members carried by the chains, with which members the braces have a sliding connection, whereby the blades are held in erect position on the upper run of the chains, and are permitted to feather on the lower run.

In testimony that I claim the foregoing as my own, I have hereto affixed my signature in the presence of two witnesses.

JOHN W. WILLSON.

Witnesses:
S. S. SIMMONS,
THEO. MILLER.